April 15, 1969 J. A. ROBERTS 3,439,262

ELECTRICAL VAPOR DETECTOR WITH INDIRECTLY HEATED CATHODE

Original Filed Dec. 4, 1964

INVENTOR
JOHN A. ROBERTS

BY George A. Herbster
ATTORNEY 3,439,262

ELECTRICAL VAPOR DETECTOR WITH INDIRECTLY HEATED CATHODE

John A. Roberts, Lynnfield Center, Mass., assignor to General Electric Company, a corporation of New York Continuation of application Ser. No. 415,997, Dec. 4, 1964. This application May 13, 1968, Ser. No. 728,627
Int. Cl. G01n 27/62
U.S. Cl. 324—33 10 Claims

ABSTRACT OF THE DISCLOSURE

A halogen leak detector element with an indirectly heated electrode. A positive, directly heated electrode is spaced from a negative electrode to indirectly heat the negative electrode. A fixed temperature differential is maintained to optimize the detector efficiency. Improved heat transfer to the negative electrode is obtained by disposing a cylinder with an inner reflective surface about the electrodes.

*Background of the invention*

This application is a continuation of an application filed Dec. 4, 1964, Ser. No. 415,997, now abandoned, and assigned to the same assignee as the present application.

This invention relates to improvements in electrical vapor detectors of the type described and claimed in my U.S. Patents 2,795,716 issued June 11, 1957, and 3,009,074 issued November 14, 1961, and assigned to the same assignee as the present invention, for detecting the presence of certain substances or impurities in gases.

The detector disclosed in the first patent is relatively expensive, extremely sensitive, and highly efficient in operation, but it requires relatively large amounts of heater power. It is thus not suitable for portable applications. On the other hand, the detector of the second patent is designed for use in a low-cost portable detector and requires lesser amounts of heater power. However, the efficiency of the detector of the later patent is less than that of the detector of the first patent. Thus, even though the detector of the second patent is suitable for portable operations and is inexpensive, it is not as efficient as would be desired and thus requires a considerable amount of input power for a given output signal. Furthermore, the amount of heat radiated by this detector tends to limit the minimum size of the package, thus making it difficult to reduce the size of the carrying case.

It is therefore an object of this invention to provide an improved vapor detector which requires smaller amounts of heater input power than present detectors.

It is also an object of this invention to provide a new and improved vapor detector which is more efficient than present low-wattage portable detectors.

It is yet another object of this invention to provide an improved vapor detector which is of simplified structure and which may be readily assembled.

It is still a further object of this invention to provide a new and improved vapor detector which is considerably smaller, more efficient, and radiates less heat than prior art detectors.

It has been found that it is not possible to reduce heater power applied to detectors of the first and second patents below approximately 35 watts and 12 watts, respectively, since, in doing so, critical electrode temperatures very rapidly drop below the points at which the detectors will function. It also proved to be unfeasible, as a practical matter, to reduce the power requirements by scaling down the devices since this led to manufacturing problems because of the resulting extremely small element sizes.

Furthermore, scaling down the devices held no promise of rendering the resulting detector more efficient.

It has been discovered that the aboslute temperatures of the two electrodes of detectors of this type are unimportant once certain minimum temperatures are exceeded, as long as a given positive temperature differential exists between the postive and negative electrodes. It has been found that when this condition exists, an optimum relationship will obtain between input heater power and output signal for a given size leak sample. This is true notwithstanding the particular electrode configuration and notwithstanding the position of the source of sensitizing material. In accordance with these criteria, an ion vapor detector is provided having a negative electrode which is placed in such a position as to permit it to be heated by the controllably heated positive electrode so as to provide the required temperature differential with a minimum expenditure of heater power.

It has been found that ideally this optimum condition exists when the negative electrode is 40° C. cooler than the positive electrode. However, in accordance with the preferred embodiment of my invention, a compromise has been struck between this temperature requirement and the minimum interelectrode spacing which can be tolerated in a detector utilized in portable equipment which is necessarily subjected to high shocks. In accordance with the preferred embodiment of my invention, the differential electrode temperature is 80° C., i.e., the positive electrode is 80° C. hotter than the negative electrode.

It is a further feature of my invention that the source of sensitizing material is remotely located with respect to the heater electrode. In accordance with the preferred embodiment of my invention, the body of sensitizing material is contained within the cylindrical negative electrode so as to permit the diffusion of atoms of the sensitizing material to the surface of the negative electrode. This removal of the body of sensitizing material from association with the positive heater considerably simplifies design of the electrodes.

*Summary*

In accordance with my invention, the electrode temperature differential required for optimum detector efficiency is obtained with a minimum amount of heater power by placing the negative electrode so that it is substantially encircled by the positive heater electrode. This provides a maximum amount of heat transfer from heater to negative electrode. A further improvement in thermal efficiency is achieved, in accordance with the preferred form of my invention, by utilizing a cylindrical heat-reflecting device which substantially encircles the positive heater electrode.

It is still a further feature of my invention tending to improve detector efficiency that the reflecting device be held at a positive potential to act as a repelling electrode tending to force the positive ions toward the centrally located negative electrode.

The illustrated preferred embodiment of my invention constitutes a clear and substantial improvement over the portable detector of my second patent, e.g., its input wattage requirements have been reduced approximately 60% while its efficiency has been improved by at least a factor of 10 without any substantial change in manufacturing costs. It should be emphasized that this comparison is not being made with respect to a device that has never been marketed but is being made with respect to a highly successful commercial portable leak detector marketed by General Electric Company and known as the Type H–7 Leak Detector.

For a better understanding of my invention, reference may be had to the following specification taken in view of the accompanying drawings.

*Brief description of the drawings*

Referring now to FIGURE 1, it is seen that the improved vapor detector of the invention includes a metallic housing 10 and a conventional miniature seven pin electronic tube base 11, each of which has apertures located on the axis of the housing for permitting the passage of gas samples to be analyzed through the detector. Located within the resultant housing is a centrally located cylindrical negative electrode 12 and a helically wound positive heater electrode 13 which is coaxially arranged with respect to negative electrode 12. Heater electrode 13, in the preferred embodiment, is formed by winding a .016 inch diameter platinum clad nickel-chromium wire, sold under the trademark Nichrome V, around a mandrel with a spacing between turns of no more than .007 inch until six complete turns have been formed. The inside diameter of heater electrode 13 is preferably .070 inch while the outside diameter of negative electrode 12 is .035 inch. Electrode 12 is preferably made of platinum and is supported from base 11 by an extension 18 of pin 14 which is secured inside its top end. The remaining portion of the interior of electrode 12 is substantially filled with an alkali metal glass 15 which serves as a source of sensitizing material. In the preferred embodiment of my invention, it has been found to be desirable to utilize a glass containing rubidium. Reference may be had to the first of my above-noted patents for a more complete discussion concerning these types of materials and methods for forming the body of sensitizing material.

Referring now to FIGURES 1 and 2, means is provided by electrode 16 for reflecting heat radiating outwardly from heater 13 so as to improve the transfer between the heater and negative electrode 12. Electrode 16, which, in the preferred embodiment of my invention, may be made of nickel, has a reflective interior surface 17 that retains its reflective characteristics at its normal operating temperature so as to prevent a slow change in detector efficiency which would be attributable to reflectivity variations.

Figure 1:
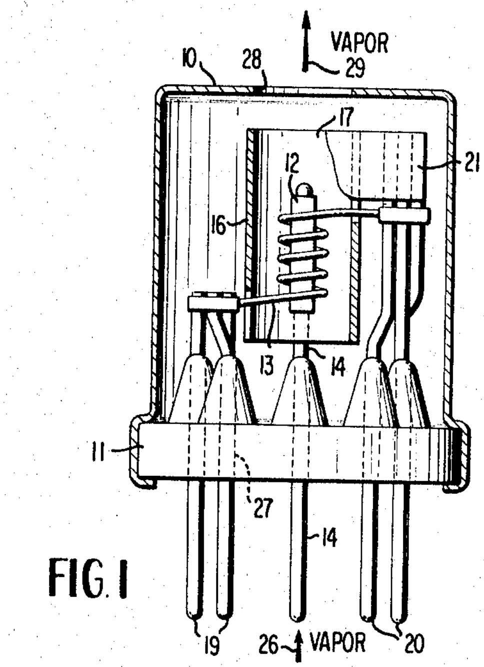
FIGURE 1 is an elevational view partially in section of a vapor detector constructed in accordance with the invention.

Pins 19, which are bent so as to be in spaced, parallel alignment at their upper ends, provide means for supporting heater 13 as well as providing means having sufficient current-carrying capacity for establishing electrical connections thereto. The other end of heater 13 is supported in like manner by pins 20.

Means is provided by tabs 21 upon reflective electrode 16 for supporting the electrode from the upper ends of pins 20. These tabs also provide means for establishing electrical connections between the reflective electrode 16 and heater 13 so as to permit it to perform its ion-repelling function.

Referring again to FIGURE 2, it may be seen that the cross-sectional configuration of electrode 16 is somewhat pear shaped so as to permit the extension 18 of supporting pin 14 to remain inside electrode 16 in proximity to heater 13 so as to minimize the conduction of heat from electrode 12 to the atmosphere outsde of reflective electrode 16.

Figure 3:
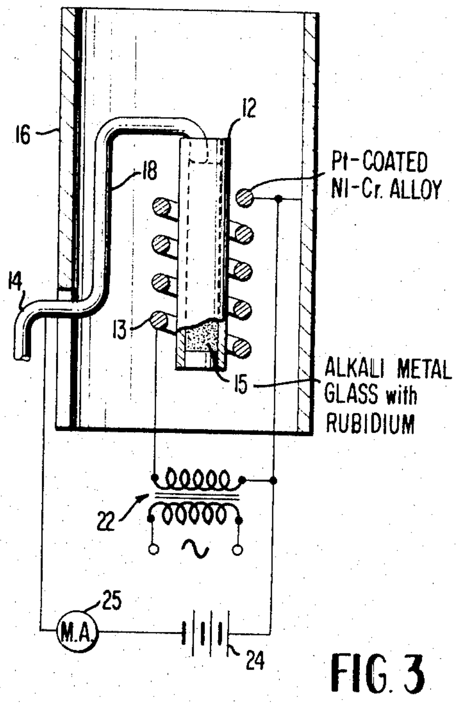
FIGURE 3 illustrates both a schematic of the electrical circuitry and a sectional view taken along lines 3—3 of FIGURE 2 in which a portion of the center electrode is broken away to disclose the electrode structure of the vapor detector formed in accordance with this invention.

FIGURE 3 illustrates a conventional electrical circuit in which the improved vapor detector of the invention may be utilized. Heater 13 may be energized from the secondary winding of transformer 22 whose primary winding may be connected to a conventional source of alternating current (not shown). The positive side of a conventional direct current source 24 may be connected to the top end of heater coil 13 and to repeller electrode 16 in a manner previously explained, and the negative side of the direct current source may be connected through a d-c micro-ammeter 25 to pin 14 and negative electrode 12.

Figures 2, 4:
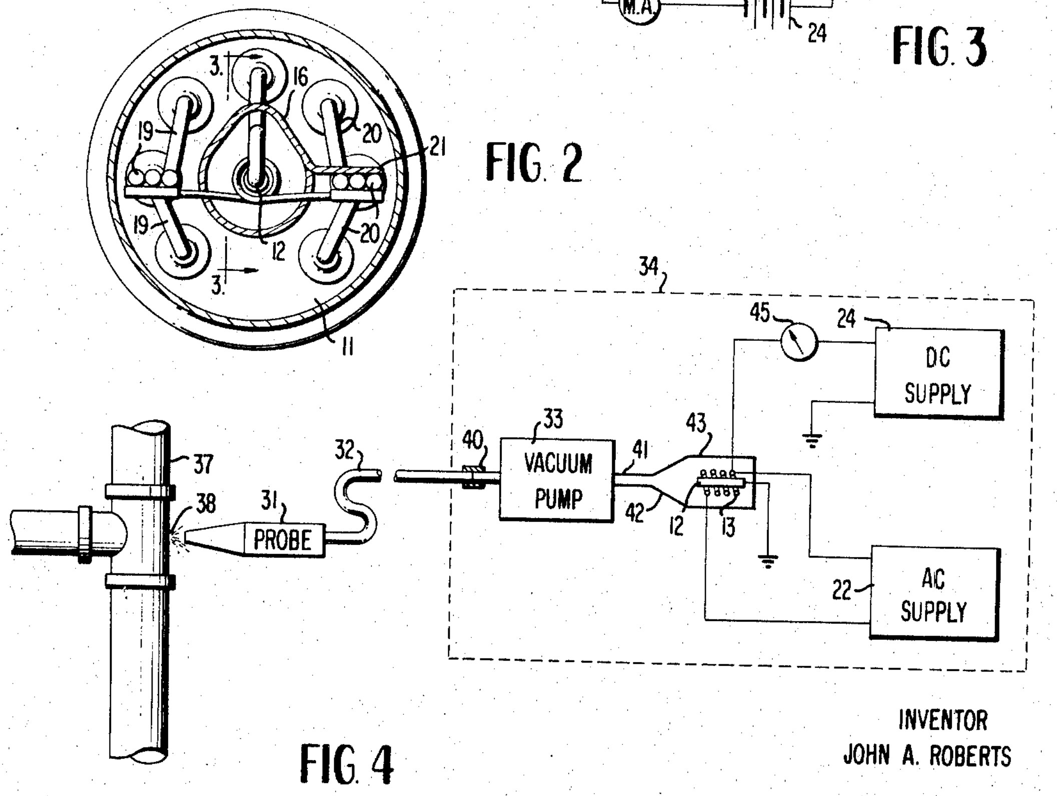
FIGURE 2 is a top plan view of a portion of the vapor detector of FIGURE 1.
FIGURE 4 is a schematic showing, partially in block diagram form, of a leak detector system incorporating this invention.

In operation, a vapor designated by an arrow 26 suspected of containing a substance of the class comprising the halogen elements and compounds thereof is introduced into housing 10 through an aperture 27 formed in the base 11 and between electrodes 12 and 13. The gas then exits through an aperture 28 in the housing 10 as represented by an arrow 29. These apertures through the base 11 and the housing 10 direct a quantity of an atmosphere containing the substance so it contacts the electrodes 12 and 13. Means for obtaining the sample and pumping it through the detector are well known in the art. For example, one leak detector system in which the detector shown in FIGURES 1 through 3 may be used is illustrated in FIGURE 4. This system is described and claimed in U.S. Patent 3,071,722 to Roberts which was issued Jan. 1, 1963, and assigned to the same assignee as the present invention.

Referring to FIGURE 4, a leak detector system includes a probe 31 connected by a relatively fine flexible tubing 32 having an inside diameter in the order of .05 inch to the inlet 40 of vacuum pump 33 positioned within the chassis or housing 34 of the leak detector sensing and indicating unit.

The probe 31 comprises a tubular plastic member having an aperture connecting to the tubing 32 and adapted to be held by the operator. The probe 31 is moved relative to an enclosed system indicated generally as 37 to which a tracer gas of the halogen family has been introduced to detect and localize leakage in the system by detection of the halogen gas on the outside of the enclosure. The probe is slowly passed by fittings and areas suspected of leakage and when it passes a point of leakage 38, halogen gas is drawn through probe 11 and tubing 12, through the inlet 40 of the vacuum pump 33 and is discharged through outlet tubing 41 having an inside diameter in the order of .05 inch into the narrow end of a diffuser 42 located in the socket or base portion of the vapor detector or sensitive element shown in FIGURES 1 through 3.

In accordance with the above discussion, the presence of a halogen gas in the detector 43, schematically illustrating the heater electrode 13 connected to the alternating current supply 22 and the negative electrode 12, increases the number of ions emitted at the heater electrode 13. These positive ions are attracted to the negatively charged electrode 12 through the action of the direct current supply 24 connected in series with a microammeter 45 or other indicator and connected between the heater electrode 13 and the negatively charged electrode 12. The magnitude of the current flow through the circuit, including the leak indicator 45, will vary in response to the presence and magnitude of the tracer gas passed through the vapor detector.

It is an important feature of this invention that the operating temperatures of the positive heater electrode and the negative collector electrode be maintained at temperatures having a fixed differential throughout the normal range of electrode temperature variations. Normally, electrode temperature variations are attributable to the line voltage variations. A ±10% line voltage variation results in a ±15% temperature variation. In accordance with the preferred embodiment of my invention, the operating temperatures of heater 13 and collector 12 are 1000° C. and 920° C., respectively, when the line voltage is at its nominal value.

What I claim as new and desire to secure by Letters Patent of the United States is:

1. A detector element for sensing a finely divided atmospheric substance taken from the group consisting of halogen elements and compounds thereof, said element being adapted for connection in a leak detector system including heater and bias power supply means and pumping means for obtaining samples of the substance, said detector element comprising:

(a) a supporting housing, (b) a sensitizing element of a material taken from the group consisting of alkali metals and compounds thereof, (c) a negative electrode supported by said housing and supporting and surrounding said sensitizing element, (d) a heater coil supported by said housing in uniformly spaced juxtaposition about said negative electrode to supply heat thereto, (e) terminal means supported by said housing and adapted for connection to the leak detector system for connecting said heater coil in series with the heater power supply means and said heater coil and negative electrode to the bias power supply means, said heater coil thereby constituting a positive electrode, and (f) a heat reflective shield supported by said housing in spaced juxtaposition about said coil to reflect heat from said heater coil to said negative electrode whereby said negative electrode is maintained at a desired fixed temperature difference below the temperature of said heater coil by heat supplied from said heater coil and reflected by said shield to effect a substantial increase in efficiency with a simultaneous reduction in consumed power.

2. A detector element as recited in claim 1 wherein said reflective heat shield is formed of a conductive material and includes means connected to said terminal means for connecting said shield to the bias power supply means.

3. A detector element as recited in claim 1 wherein said negative electrode is a cylindrically cup-shaped electrode substantially filled with an alkali metal glass.

4. A detector element as recited in claim 3 wherein said heater coil is a filament of spaced turns cylindrically configured and coaxially positioned with respect to said negative eectrode.

5. A detector element as recited in claim 4 wherein said heat reflective shield comprises a conductive member coaxially positioned with respect to both said negative electrode and said heater coil and electrically connected to said heater coil and is composed of a material which retains its heat reflective characteristics at normal operating temperatures of said detector element.

6. A detector element as recited in claim 5 wherein said negative electrode is formed of platinum, said alkali metal glass in said sensitizing element contains rubidium and said coil is formed of a platinum-coated nickel-chromium alloy.

7. A system for detecting the presence of a finely divided atmospheric substance taken from the group consisting of halogen elements and compounds thereof comprising:

(a) probe means for obtaining a sample of a gas to be tested, (b) means for pumping the sample at a controlled rate, (c) a detector element connected to said pumping means so said gas sample passes thereto from said probe means including:

(i) a supporting enclosure having apertures therethrough to permit passage of the gas sample through said detector element, (ii) a sensitizing element of a material taken from the group consisting of alkali metals and compounds thereof, (iii) a substantially cylindrical negative electrode supported by said enclosure supporting and surrounding said sensitizing element, (iv) a cylindrical heater coil supported by said housing in uniformly spaced juxtaposition about said negative electrode to supply heat thereto, (v) a heat reflective shield supported by said housing in spaced juxtaposition about said coil to reflect heat from said heater coil to said negative electrode, (vi) terminal means connected to said negative electrode, said heater coil and said shield and supported by said housing, (d) heater current supply means connected to said terminal means for energizing said heater coil, (e) direct current bias supply means connected to said terminal means for biasing said heater coil and shield positively with respect to said negative electrode, and (f) indicator means in series with said bias current supply means to indicate changes in the bias current in the presence of the substance, said negative electrode being maintained at a desired fixed temperature difference below the temperature of said heater coil by heat supplied from said heater coil and reflected by said shield to effect a substantial increase in efficiency of the leak detector system with a simultaneous reduction in consumed power.

8. A leak detector system as recited in claim 7 wherein said heater coil is composed of a platinum-coated nickel-chromium alloy, said negative electrode, of platinum, said sensitizing material, of an alkali metal containing glass, and said shield, of a conductive material which retains its heat reflecting characteristics at normal operating temperatures.

9. A leak detector system as recited in claim 8 wherein said alkali metal containing glass contains rubidium.

10. A leak detector system as recited in claim 8 wherein said desired fixed temperature difference is in the range from 40° to 80° C.

References Cited

UNITED STATES PATENTS

| | | | |
|---|---|---|---|
| 1,914,883 | 6/1933 | Cottrell | 324—33 |
| 2,550,498 | 4/1951 | Rice | 324—33 |
| 2,814,018 | 11/1957 | Zemany | 324—33 |
| 2,979,631 | 4/1961 | Moesta | 313—63 |
| 3,009,074 | 11/1961 | Roberts | 324—33 X |

RUDOLPH V. ROLINEC, *Primary Examiner.*

C. F. ROBERTS, *Assistant Examiner.*

U.S. Cl. X.R.

313—7, 38, 47